Dec. 21, 1954  H. W. LORD  2,697,825
NONLINEAR RESONANT ELECTRICAL CIRCUIT
Filed March 15, 1951  2 Sheets-Sheet 1
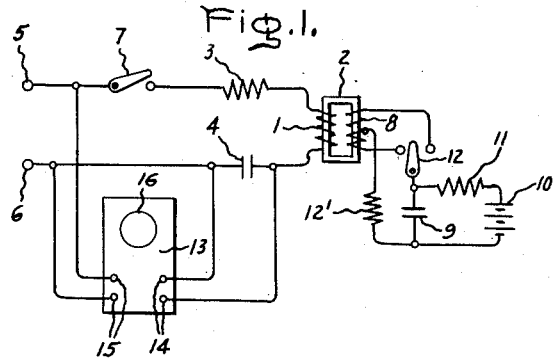
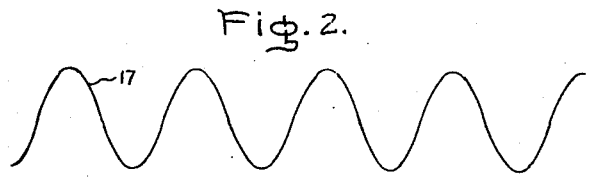
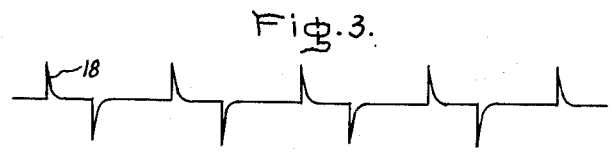
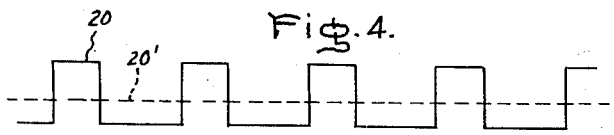
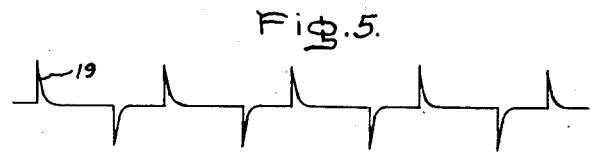
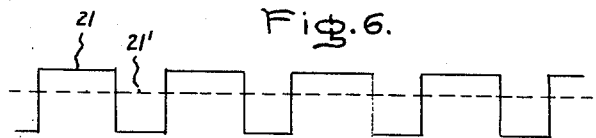
Inventor:
Harold W. Lord,
by Paul A. Frank
His Attorney.

Dec. 21, 1954  H. W. LORD  2,697,825
NONLINEAR RESONANT ELECTRICAL CIRCUIT
Filed March 15, 1951  2 Sheets-Sheet 2
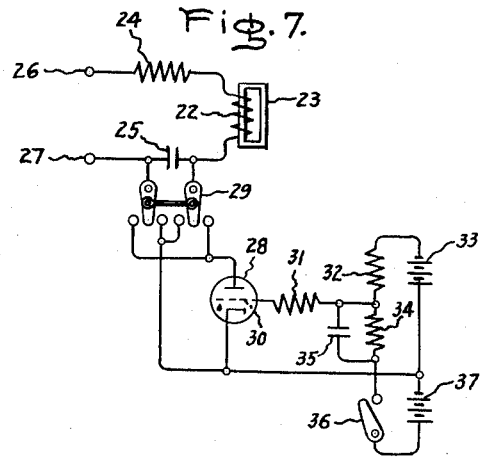
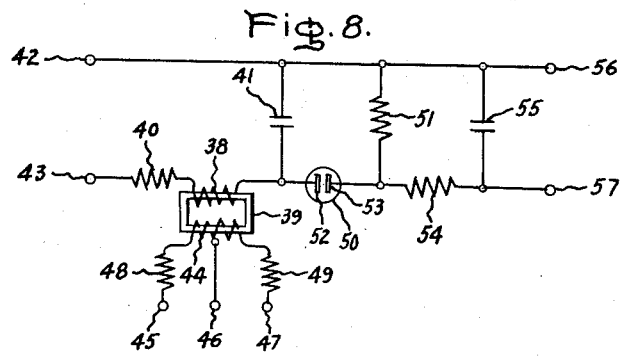
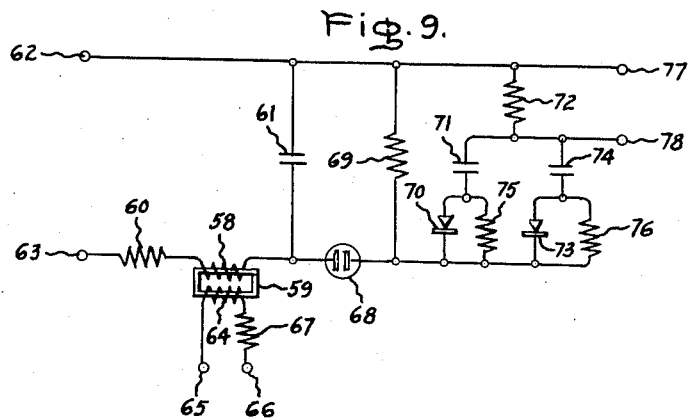
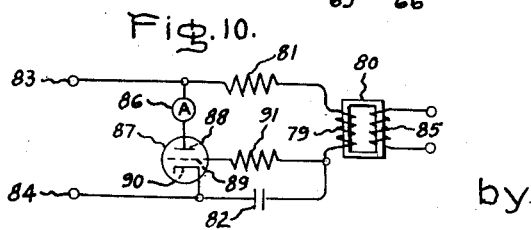
Inventor:
Harold W. Lord,
by Paul A. Frank
His Attorney.

United States Patent Office 2,697,825
Patented Dec. 21, 1954

2,697,825

NONLINEAR RESONANT ELECTRICAL CIRCUIT

Harold W. Lord, Schenectady, N. Y., assignor to General Electric Company, a corporation of New York Application March 15, 1951, Serial No. 215,737

24 Claims. (Cl. 340—253)

This invention relates to a non-linear resonant electrical circuit having two stable modes of operation, which can be switched from one mode to the other by an externally applied electric signal. Such a circuit is useful, for example, as a storage "memory" unit in a binary digital computor, wherein one mode of operation may represent the binary digit "0," and the other mode of operation may represent the binary digit "1." Other uses and applications will occur to those skilled in the art.

An object of this invention is to provide an improved non-linear resonant electrical circuit having two stable modes of operation.

Another object is to provide an improved electrical circuit having two stable modes of operation, which is compact, rugged, and highly reliable.

Other objects and advantages will appear as the description proceeds.

The features of this invention which are believed to be novel and patentable are pointed out in the claims which form a part of this specification. For a better understanding of the invention, reference is made in the following description to the accompanying drawings in which Fig. 1 is a schematic circuit diagram of apparatus illustrating the principle of this invention, Figs. 2 to 6 inclusive are graphical representations of electrical waveforms hereinafter used in explaining the invention, Fig. 7 is a schematic circuit diagram of other apparatus illustrating the principle of this invention, Figs. 8 and 9 are schematic circuit diagrams of apparatus useful as binary number-storage units for a computor, and Fig. 10 is a schematic circuit diagram of still other apparatus illustrating the principle of this invention.

Referring now to Fig. 1 of the drawing, an inductor winding 1 is wound about a magnetic inductor core 2 of material having a rectangular hysteresis loop, and preferably having high maximum permeability and retentivity. Good results have been obtained with a reactor core of an oriented 50% nickel-50% iron alloy in the form of laminations having a thickness in the order of .005". Connected in series non-linear resonant circuit with winding 1 are a resistor 3, and a capacitor 4. Alternating voltage is applied across this series resonant circuit from any suitable alternating voltage source through terminals 5 and 6. A switch 7 may be provided for selectively opening or closing the circuit.

A center-tapped winding 8 may be also provided about inductor core 2. A capacitor 9 is charged by suitable means such as a battery 10 and a resistor 11. A normally-open double-throw switch 12 is connected as shown for selectively discharging capacitor 9 through either half of center-tapped winding 8. If needed, a resistor 12' may be connected in series between capacitor 9 and winding 8 to damp any oscillatory tendency of this circuit.

For observing the waveform of voltages across the capacitor 4, a cathode ray oscillograph 13 has its vertical deflection terminals 14 connected across capacitor 4, and its synchronizing terminals 15 connected to terminals 5 and 6, as shown. Thus the horizontal "sweep" of the oscillograph is synchronized with the alternating voltage applied to terminals 5 and 6, and the waveform of the voltage across capacitor 4 is displayed upon the cathode ray oscillograph screen 16.

Operation of this circuit may best be understood by reference to the electrical waveforms illustrated in Figs. 2 to 6, inclusive. Curve 17, Fig. 2, represents the sinusoidal waveform of alternating voltage applied between terminals 5 and 6, Fig. 1. When switch 7 is closed, current flows through the series non-linear resonant circuit comprising resistor 3, reactor winding 1, and capacitor 4. Curve 18, Fig. 3, and curve 19, Fig. 5, represent waveforms of this current which may be obtained under certain conditions hereinafter more fully explained. Curve 20, Fig. 4, and curve 21, Fig. 6, represent corresponding waveforms of voltage across the capacitor 4. Dotted lines 20' and 21' represent zero voltage. Curves 20 and 21 may be observed on cathode ray oscillograph screen 16.

Due to the magnetic characteristics of the material in inductor core 2, the reactance of winding 1 is very high for low values of current before the magnetic flux in core 2 reaches saturation, and then becomes very low beyond the knee of the magnetization curve. As a result, current through the circuit flows in short pulses, as illustrated in curves 18 and 19, and the voltage across capacitor 4 has a rectangular waveform, as illustrated by curves 20 and 21. By adjusting the values of resistor 3 and capacitor 4, and the amplitude of alternating voltage applied between terminals 5 and 6, the voltage across capacitor 4 may be made asymmetric, so that the rectangular voltage pulses of one polarity have a relatively large amplitude and short duration, while those of the opposite polarity have a relatively small amplitude and long duration. The non-linear resonant circuit then has two stable modes of operation, one of which is represented by curves 18 and 20, and the other of which is represented by curves 19 and 21. Either of these modes of operation may be obtained selectively, depending upon the instant during the alternating current cycle at which switch 7 is closed. It may be noted from curves 20 and 21 that one state of operation provides positive rectangular voltage pulses of relatively large amplitude, while the other mode of operation provides negative rectangular voltage pulses of relatively large amplitude. That is, the asymmetry of the voltage across capacitor 4 is reversed in changing from one mode of operation to the other.

While switch 7 remains closed, selective switching of the non-linear resonant circuit from one stable operating state to the other may be accomplished by introducing suitable electric transient impulses into the resonant circuit. In the Fig. 1 circuit, this may be done by momentarily closing switch 12 either to the left or to the right, selectively. When switch 12 is closed to the left, capacitor 9 discharges through the lower half of center-tapped winding 8, and thereby injects into the resonant circuit, through the magnetic coupling between windings 1 and 8, a transient impulse of predetermined polarity. This causes the resonant circuit to assume a predetermined one of its operating states. After switch 12 is opened, the resonant circuit continues in the same state of operation, and repeated closing of switch 12 to the left has no effect on the circuit. However, if switch 12 is closed to the right, capacitor 9 discharges through the upper half of center-tapped winding 8, and a transient of opposite polarity is introduced into the resonant circuit. This causes the resonant circuit to switch over to its other state of operation. Since the direction of asymmetry of the voltage across capacitor 4, and hence the operating state of the resonant circuit, is indicated by the waveform observed on oscillograph screen 16, the observed waveform indicates whether the last closing of switch 12 was to the left or to the right. Thus, the circuit may operate as a memory unit for the storage of information as to the direction of the last closing of switch 12.

Fig. 7 illustrates an alternate way of introducing switching transients into the resonant circuit. In this figure, inductor winding 22 is wound upon a magnetic inductor core 23 having magnetic characteristics similar to those of core 2 of Fig. 1. A resistor 24 and a capacitor 25 are connected in series non-linear resonant circuit with winding 22. Alternating voltage from any suitable source is applied across this resonant circuit through terminals 26 and 27.

An electric discharge device 28, preferably a thyratron, is connected across capacitor 25 with selectively variable polarity through a reversing switch 29. The control electrode 30 of device 28 is connected through resistors 31 and 32 to the negative terminal of a battery 33, or other suitable voltage source, whereby device 28 is biased to be normally non-conductive. Control electrode 30 is also connected through resistor 31, resistor 34 and capacitor 35 in parallel, and switch 36 to the positive terminal of a battery 37. The positive terminal of battery 33 and the negative terminal of battery 37 are connected to the cathode of device 28.

The series non-linear resonant circuit comprising resistor 24, winding 22 and capacitor 25 has two stable operating states respectively characterized by rectangular waveform voltages of opposite asymmetry across capacitor 25. When switch 36 is closed momentarily, a current impulse is conducted by device 28 which supplies to the non-linear resonant circuit an electric impulse of selectively variable polarity depending upon the position of reversing switch 29. These transient impulses may be used for selectively switching the resonant circuit from one operating state to the other.

Fig. 8 illustrates a number-storage and indicator circuit especially useful in binary computing systems wherein different binary digits are represented by electric pulses of like polarity occurring in different electrical circuits. For example, a pulse in one circuit may represent the binary digit "0," while a pulse in another circuit may represent the binary digit "1."

Referring now to Fig. 8, an inductor winding 38 is wound about a magnetic inductor core 39 having magnetic characteristics similar to those of core 2, Fig. 1. A resistor 40 and a capacitor 41 are connected in series non-linear resonant circuit with winding 38. Alternating voltage from any convenient source is applied across this series resonant circuit through terminals 42 and 43. A centertapped winding 44 is also provided about magnetic core 39. The left-hand half of winding 44 is connected between terminals 45 and 46, while the right-hand half of winding 44 is connected between terminals 46 and 47. Resistors 48 and 49 may be connected in series with the respective halves of winding 44, as shown, to prevent a short-circuit of the inductor winding by the computer circuits.

The non-linear resonant circuit comprising resistor 40, winding 38 and capacitor 41 has two stable states of operation characterized by rectangular waveform voltages of opposite asymmetry across capacitor 41, as hereinbefore explained. An electric impulse applied between terminals 45 and 46 supplies a transient impulse to the resonant circuit which causes it to assume a predetermined one of its operating states, whereas an electrical impulse applied between terminals 47 and 46 introduces into the resonant circuit a transient of opposite polarity which causes the resonant circuit to assume the other of its operating states. A pulse supplied between terminals 45 and 46 from a computor system may represent the binary digit "0," for example, while a pulse applied between terminals 47 and 46 from the computor system may represent the binary digit "1." The operating state of the non-linear resonant circuit corresponds to the last digit received, so that the circuit operates as a number-storage unit.

A visual indication of the operating state of the resonant circuit is provided by a glow lamp 50 and a resistor 51 connected in series across capacitor 41, as shown. Glow lamp 50 may be of the usual neon-filled or argonfilled type. The value of resistor 51 is chosen such that lamp 50 conducts current only during the relatively large amplitude portions of the asymmetric rectangular waveform voltage across capacitor 41. Thus, lamp 50 conducts current in one direction only during one operating state of the non-linear resonant circuit, and conducts current in the other direction during the other operating state. Such glow lamps have the characteristic that a visible glow occurs at one electrode of the lamp when the lamp conducts current in one direction, and occurs at the other electrode of the lamp when current is conducted in the opposite direction. Therefore, a visible glow occurs at electrode 52 of lamp 50 during one operating state of the non-linear resonant circuit, and occurs at electrode 53 of lamp 50 during the other operating state. Lamp 50 thus provides a visual indication of the operating state of the resonant circuit, and therefore indicates whether the last impulse received was between terminals 45 and 46, representing the digit "0," or between terminals 47 and 46, representing the digit "1."

To provide an electrical indication, to operate a meter or to operate other computing apparatus, a filter circuit comprising a resistor 54 and a capacitor 55 in series is connected across resistor 51, as shown. Preferably the resistance of resistor 54 is much greater than that of resistor 51. Since lamp 50 conducts current in one direction only during a given operating state of the non-linear resonant circuit, it acts as a rectifying means, and there is a direct component of voltage across resistor 51 having a polarity which corresponds to the operating state of the resonant circuit. This direct component of voltage appears across capacitor 55, while alternating components are removed by the filter. Output connections 56 and 57, connected across capacitor 55 as shown, therefore provide a direct voltage having a polarity which corresponds to the digit represented by the last impulse received at terminals 45—47. Where only the electrical indications are required, without visual indications from the lamp, glow lamp 50 may be replaced with other non-linear resistance means having similar rectifying characteristics.

For some computor systems, it is desirable that indications be provided in the form of electric pulses having a polarity which corresponds to the binary digit represented. In these systems, a positive impulse may represent one binary digit, while a negative impulse represents the other digit. A circuit useful in such systems is shown in Fig. 9. In this figure, an inductor winding 58 is wound about a magnetic core 59 having magnetic characteristics similar to those of core 2, Fig. 1. A resistor 60 and a capacitor 61 are connected in series nonlinear resonant circuit with winding 58. Alternating voltage from any suitable source is applied across this resonant circuit through terminals 62 and 63. The non-linear resonant circuit has two stable states of operation, as hereinbefore described, characterized by rectangular waveform voltages of opposite asymmetry across capacitor 61.

A second winding 64 is provided upon magnetic core 59, and is connected to terminals 65 and 66 through a de-coupling resistor 67. A negative electric impulse applied between terminals 65 and 66, which may represent the binary digit "0," for example, introduces into the resonant circuit a transient impulse of predetermined polarity which causes the resonant circuit to assume a predetermined one of its operating states. A positive elective impulse applied between terminals 65 and 66, which may represent the binary digit "1," introduces a transient impulse of opposite polarity into the resonant circuit, and causes the resonant circuit to assume the other of its operating states. A visual indication of the operating state of the resonant circuit may be provided by a glow lamp 68 and a resistor 69 connected in series across capacitor 61, in the manner hereinbefore described.

To provide an output indication in the form of electric pulses, a differentiating circuit is connected across resistor 69. The differentiating circuit may comprise a rectifier 70, a capacitor 71 and a resistor 72 connected in series across resistor 69, as shown. A rectifier 73 and a capacitor 74 are also connected in series with resistor 72 across resistor 69. A resistor 75 is connected across rectifier 70, and a resistor 76 is connected across rectifier 73. Output connections 77 and 78 are connected across resistor 72.

In this circuit the voltage across resistor 69, which approaches a rectangular waveform, is differentiated by the capacitors 71 and 74, the differential appearing as a voltage across resistor 72. Rectifiers 70 and 73, which have opposite polarities, impart opposite unidirectional properties to the two portions of the differentiating circuit. By proper choice of values for capacitors 71 and 74, and resistors 69, 72, 75 and 76, the polarity of the highest amplitude pulse output at terminals 77 and 78 indicates the operating state of the non-linear resonant circuit. This is due to the fact that the glow lamp 68 has a low resistance after ignition; hence the build-up of current through resistor 69 can be more rapid than the decay of current through resistor 69, since the capacitors 71 and 74 must discharge through resistor 69. The trailing edge of the current waveform through resistor 69 will therefore decay as a function of the time constant of the circuits which include the capacitors 71 and 74 and their associated resistors 75 and 76 as added to resistors 69 and 72 in series. The voltage across resistor 72 at the trailing edge of the current waveform through resistor 69 will therefore be much lower in peak value than that occurring due to the leading edge of this current waveform. A reversal of the polarity of the current through resistor 69, due to a reversal of asymmetry of the voltage waveform across capacitor 61 upon a change from one operating state to the other of the resonant circuit, produces a reversal of the polarity of the high-amplitude pulse appearing between output terminals 77 and 78. The polarity of this pulse therefore indicates the mode of operation of the non-linear resonant circuit. Thus, the circuit described provides at output terminals 77 and 78 a series of high-amplitude electrical impulses, one impulse per cycle of the alternating voltage applied between terminals 62 and 63, having a polarity determined by the polarity of the last impulse applied between input terminals 65 and 66.

The circuits described are especially useful as number-storage and indicating circuits in binary digital computing systems because of their compactness, ruggedness and the high reliability provided by the absence of vacuum tubes and mechanical contacts. However, it will be appreciated that other uses may be found for these circuits, and that such are within the true scope of this invention.

Fig. 10 illustrates other means for indicating the operating state of the circuit. Referring now to Fig. 10, inductor winding 79 is wound upon a magnetic inductor core 80 having magnetic characteristics similar to those of core 2, Fig. 1. A resistor 81 and a capacitor 82 are connected in series non-linear resonant circuit with winding 79. Alternating voltage from any suitable source is applied across this resonant circuit through terminals 83 and 84. Another winding 85 is also wound upon core 80. As hereinbefore explained, a voltage of asymmetrical rectangular waveform appears across capacitor 82, and the direction of asymmetry of this voltage may be selectively reversed by the application of electric impulses of selectively variable polarity to winding 85.

Means for indicating the direction of asymmetry of the voltage across capacitor 82 is provided by an ammeter 86 and an electron discharge device 87 having an anode 88, a control electrode 89 and a cathode 90. Ammeter 86, anode 88 and cathode 90 are connected in series across terminals 83 and 84, as shown. Control electrode 89 and cathode 90 are connected across capacitor 82. A current-limiting resistor 91 may be connected in series with control electrode 89, as shown.

When both anode 88 and control electrode 89 are positive, device 87 conducts substantially the saturation current of the device, which is limited only by the electron emission of cathode 90. When either anode 88 or control electrode 89 is negative, device 87 conducts substantially no current. Referring to the waveforms illustrated in Figs. 1, 4 and 6, curve 17 may represent the anode potential, curve 20 may represent the control electrode potential for a first operating state of the circuit, and curve 21 may represent the control electrode potential for the second operating state of the circuit. It is evident from the curves that both anode 88 and control electrode 89 are positive for a greater portion of each cycle during the second operating state of the circuit than during the first operating state. Therefore more current flows through ammeter 86 when the circuit is operating in its second state, so that ammeter 86 provides two different indications selectively, depending upon the direction of asymmetry of the rectangular waveform voltage across capacitor 82.

Having described the principle of this invention in the best mode in which I have contemplated applying that principle, I wish it to be understood that the examples described are illustrative only, and that other means may be employed without departing from the true scope of the invention.

What I claim as new and desire to secure by Letters Patent of the United States is:

1. An electrical circuit comprising an inductor with a magnetic core of material having a rectangular hysteresis loop, a resistor and a capacitor connected in series non-linear resonant circuit with said inductor, means for applying alternating voltage across said series resonant circuit, whereby voltage of asymmetrical rectangular waveform is provided across said capacitor, and means for applying transient electric impulses to said series resonant circuit for selectively reversing the asymmetry of said rectangular waveform voltage.

2. An electrical circuit comprising an inductor with a magnetic core of material having high maximum permeability and retentivity and a rectangular hysteresis loop, a resistor and a capacitor connected in series non-linear resonant circuit with said inductor, means for applying alternating voltage across said series resonant circuit, whereby voltage of asymmetrical rectangular waveform is provided across said capacitor, and means for applying transient electric impulses of selectively variable polarity to said series resonant circuit for selectively reversing the asymmetry of said rectangular waveform voltage.

3. An electrical circuit comprising an inductor with a laminated magnetic core of material having high maximum permeability and retentivity and a rectangular hysteresis loop, the laminations of said core each having a thickness in the order of .005 inch, a resistor and a capacitor connected in series non-linear resonant circuit with said inductor, means for applying alternating voltage across said series resonant circuit, whereby voltage of asymmetrical rectangular waveform is provided across said capacitor, and means for applying transient electric impulses of selectively variable polarity to said series resonant circuit for selectively reversing the asymmetry of said rectangular waveform voltage.

4. An electrical circuit comprising an inductor with a laminated magnetic core of an oriented nickel-iron alloy having a rectangular hysteresis loop, a resistor and a capacitor connected in series non-linear resonant circuit with said inductor, means for applying alternating voltage across said series resonant circuit, whereby voltage of asymmetrical rectangular waveform is provided across said capacitor, and means for applying transient electric impulses of selectively variable polarity to said series resonant circuit for selectively reversing the asymmetry of said rectangular waveform voltage.

5. An electrical circuit comprising an inductor with a laminated magnetic core of an oriented 50% nickel-50% iron alloy, the laminations of said core each having a thickness in the order of .005 inch, a resistor and a capacitor connected in series non-linear resonant circuit with said inductor, means for applying alternating voltage across said series resonant circuit, whereby voltage of asymmetrical rectangular waveform is provided across said capacitor, and means for applying transient electric impulses of selectively variable polarity to said series resonant circuit for selectively reversing the asymmetry of said rectangular waveform voltage.

6. An electrical circuit comprising a magnetic inductor core of material having a rectangular hysteresis loop, an inductor winding upon said core, a resistor and a capacitor connected in series non-linear resonant circuit with said inductor winding, means for applying alternating voltage across said series resonant circuit, whereby voltage of asymmetrical rectangular waveform is provided across said capacitor, a second winding upon said inductor core, and means for applying transient electric impulses to said second winding for selectively reversing the asymmetry of said rectangular waveform voltage.

7. An electrical circuit comprising a magnetic inductor core of material having high maximum permeability and retentivity and a rectangular hysteresis loop, an inductor winding upon said core, a resistor and a capacitor connected in series non-linear resonant circuit with said inductor winding, means for applying alternating voltage across said series resonant circuit, whereby voltage of asymmetrical rectangular waveform is provided across said capacitor, a second winding upon said inductor core, and means for applying transient electric impulses of selectively variable polarity to said second winding for selectively reversing the asymmetry of said rectangular waveform voltage.

8. An electrical circuit comprising a magnetic inductor core of material having high maximum permeability and selectivity and a rectangular hysteresis loop, an inductor winding upon said core, a resistor and a capacitor connected in series non-linear resonant circuit with said inductor winding, means for applying alternating voltage across said series resonant circuit, whereby voltage of asymmetrical rectangular waveform is provided across said capacitor, a center-tapped winding upon said inductor core, and means for selectively applying transient electric impulses to respective halves of said center-tapped winding for selectively reversing the asymmetry of said rectangular waveform voltage.

9. An electrical circuit comprising a laminated magnetic inductor core of material having high maximum permeability and retentivity and a rectangular hysteresis loop, the laminations of said core each having a thickness in the order of .005 inch, an inductor winding upon said core, a resistor and a capacitor connected in series non-linear resonant circuit with said inductor winding, means for applying alternating voltage across said series resonant circuit, whereby voltage of asymmetrical rectangular waveform is provided across said capacitor, a second winding upon said inductor core, and means for applying transient electric impulses of selectively variable polarity to said second winding for selectively reversing the asymmetry of said rectangular waveform voltage.

10. An electrical circuit comprising a laminated magnetic inductor core of material having high maximum permeability and retentivity and a rectangular hysteresis loop, the laminations of said core each having a thickness in the order of .005 inch, an inductor winding upon said core, a resistor and a capacitor connected in series non-linear resonant circuit with said inductor winding, means for applying alternating voltage across said series resonant circuit, whereby voltage of asymmetrical rectangular waveform is provided across said capacitor, a center-tapped winding upon said inductor core, and means for selectively applying transient electric impulses to respective halves of said center-tapped winding for selectively reversing the asymmetry of said rectangular waveform voltage.

11. An electrical circuit comprising a laminated magnetic core of an oriented 50% nickel-50% iron alloy, the laminations of said core each having a thickness in the order of .005 inch, an inductor winding upon said core, a resistor and a capacitor connected in series non-linear resonant circuit with said inductor winding, means for applying alternating voltage across said series resonant circuit, whereby voltage of asymmetrical rectangular waveform is provided across said capacitor, a second winding upon said inductor core, and means for applying transient electric impulses of selectively variable polarity to said second winding for selectively reversing the asymmetry of said rectangular waveform voltage.

12. An electrical circuit comprising a laminated magnetic core of an oriented 50% nickel-50% iron alloy, the laminations of said core each having a thickness in the order of .005 inch, an inductor winding upon said core, a resistor and a capacitor connected in series non-linear resonant circuit with said inductor winding, means for applying alternating voltage across said series resonant circuit, whereby voltage of asymmetrical rectangular waveform is provided across said capacitor, a center-tapped winding upon said inductor core, and means for selectively applying transient electric impulses to respective halves of said center-tapped winding for selectively reversing the asymmetry of said rectangular waveform voltage.

13. An electrical circuit comprising an inductor with a magnetic core of material having a rectangular hysteresis loop, a resistor and a capacitor connected in series non-linear resonant circuit with said inductor, means for applying alternating voltage across said series resonant circuit, whereby voltage of asymmetrical rectangular waveform is provided across said capacitor, and means connected across said capacitor for applying thereto transient electric impulses of selectively variable polarity for selectively reversing the asymmetry of said rectangular waveform voltage.

14. An electrical circuit comprising an inductor with a laminated magnetic core of an oriented 50% nickel-50% iron alloy, the laminations of said core each having a thickness in the order of .005 inch, a resistor and a capacitor connected in series non-linear resonant circuit with said inductor, means for applying alternating voltage across said series resonant circuit, whereby voltage of asymmetrical rectangular waveform is provided across said capacitor, an electric discharge device having a control electrode, means including a reversing switch connecting said discharge device across said capacitor with selectively variable polarity, means biasing said discharge device to be normally non-conductive, and means for applying electric impulses to said control electrode to render said discharge device momentarily conductive, whereby transient electric impulses of selectively variable polarity are applied across said capacitor for selectively reversing the asymmetry of said rectangular waveform voltage.

15. An electrical circuit comprising an inductor with a magnetic core of material having a rectangular hysteresis loop, a resistor and a capacitor connected in series non-linear resonant circuit with said inductor, means for applying alternating voltage across said series resonant circuit, whereby voltage of asymmetrical rectangular waveform is provided across said capacitor, means for applying transient electric impulses to said series resonant circuit for selectively reversing the asymmetry of said rectangular waveform voltage, and non-linear resistance means for providing a direct voltage having a polarity corresponding to the direction of such asymmetry.

16. An electrical circuit comprising an inductor with a magnetic core of material having high maximum permeability and a rectangular hysteresis loop, an inductor winding upon said core, a first resistor and a capacitor connected in series non-linear resonant circuit with said inductor winding, means for applying alternating voltage across said series resonant circuit, whereby voltage of asymmetrical rectangular waveform is provided across said capacitor, a second winding upon said core, means for applying transient electric impulses of selectively variable polarity to said second winding for selectively reversing the asymmetry of said rectangular voltage, and non-linear resistance means and a second resistor connected in series across said capacitor.

17. An electrical circuit comprising a magnetic inductor core of material having high maximum permeability and retentivity and a rectangular hysteresis loop, an inductor winding upon said core, a first resistor and a capacitor connected in series non-linear resonant circuit with said inductor winding, means for applying alternating voltage across said series resonant circuit, whereby voltage of asymmetrical rectangular waveform is provided across said capacitor, a center-tapped winding upon said inductor core, means for selectively applying transient electric impulses to respective halves of said center-tapped winding for selectively reversing the asymmetry of said rectangular waveform voltage, and non-linear resistance means and a second resistor connected in series across said capacitor.

18. An electrical circuit comprising a laminated magnetic core of an oriented 50% nickel-50% iron alloy, the laminations of said core each having a thickness in the order of .005 inch, an inductor winding upon said core, a first resistor and a first capacitor connected in series non-linear resonant circuit with said inductor winding, means for applying alternating voltage across said series resonant circuit, whereby voltage of asymmetrical rectangular waveform is provided across said first capacitor, a center-tapped winding upon said core, means for applying transient electric impulses to respective halves of said center-tapped winding for selectively reversing the asymmetry of said rectangular waveform voltage, non-linear resistance means and a second resistor connected in series across said capacitor, a third resistor and a second capacitor connected in series across said second resistor, and output connections across said second capacitor.

19. An electrical circuit comprising an inductor having a magnetic core of material having a rectangular hysteresis loop, a first resistor and a capacitor connected in series non-linear circuit with said inductor, means for applying alternating voltage across said series resonant circuit, whereby voltage of asymmetrical rectangular waveform is provided across said capacitor, means for applying transient electric impulses to said series resonant circuit for selectively reversing the asymmetry of said rectangular waveform voltage, non-linear resistance means and a second resistor connected in series across said capacitor, and pulse-forming means connected across said second resistor.

20. An electrical circuit comprising a magnetic inductor core of material having high maximum permeability and retentivity and a rectangular hysteresis loop, an inductor winding upon said core, a first resistor and a first capacitor connected in series non-linear resonant circuit with said inductor winding, means for applying alternating voltage across said series resonant circuit, whereby voltage of asymmetrical rectangular waveform is provided across said first capacitor, a second winding upon said inductor core, means for applying transient electric impulses of selectively variable polarity to said second winding for selectively reversing the asymmetry of said rectangular waveform voltage, non-linear resistance means and a second resistor connected in series across said first capacitor, a third resistor, and rectifying means and a second capacitor connected in series with said third resistor across said second resistor.

21. An electrical circuit comprising a laminated magnetic core of an oriented 50% nickel-50% iron alloy, the laminations of said core each having a thickness in the order of .005 inch, an inductor winding upon said core, a first resistor and a first capacitor connected in series non-linear resonant circuit with said inductor winding, means for applying alternating voltage across said series resonant circuit, whereby voltage of asymmetrictl rectangular waveform is provided across said first capacitor, a second winding upon said core, means for applying transient electric impulses of selectively variable polarity to said second winding for selectively reversing the asymmetry of said rectangular waveform voltage, non-linear resistance means and a second resistor connected in series across said first capacitor, a third resistor, first rectifying means and a second capacitor connected in series with said third resistor across said second resistor, a fourth resistor connected across said first rectifying means, second rectifying means and a third capacitor connected in series with said third resistor across said second resistor, said first rectifying means and said second rectifying means having opposite polarities, a fifth resistor connected across said second rectifying means, and output connections across said third resistor.

22. An electrical circuit comprising an inductor with a magnetic core of material having a rectangular hysteresis loop, a resistor and a capacitor connected in series non-linear resonant circuit with said inductor, means for applying alternating voltage across said series resonant circuit, whereby voltage of asymmetrical rectangular waveform is provided across said capacitor, means for applying transient electric impulses to said series resonant circuit for selectively reversing the asymmetry of said rectangular waveform voltage, and means for indicating the direction of such asymmetry comprising an ammeter and an electron discharge device having an anode, a control electrode and a cathode, said ammeter, anode and cathode being connected across said means for applying alternating voltage, and said control electrode and cathode being connected across said capacitor.

23. An electrical circuit comprising a magnetic inductor core of material having high maximum permeability and retentivity and a rectangular hysteresis loop, an inductor winding upon said core, a resistor and a capacitor connected in series non-linear resonant circuit with said inductor winding, means for applying alternating voltage across said resonant circuit, whereby voltage of asymmetrical rectangular waveform is provided across said capacitor, a second winding upon said inductor core, means for applying transient electric impulses of selectively variable polarity to said second winding for selectively reversing the asymmetry of said rectangular waveform voltage, and means for indicating the direction of such asymmetry comprising an ammeter and an electron discharge device having an anode, a control electrode and a cathode, said ammeter, anode and cathode being connected across said means for applying alternating voltage, and said control electrode and cathode being connected across said capacitor.

24. An electrical circuit comprising a laminated magnetic core of an oriented 50% nickel-50% iron alloy, the laminations of said core each having a thickness in the order of .005 inch, an inductor winding upon said core, a resistor and a capacitor connected in series non-linear resonant circuit with said inductor winding, means for applying alternating voltage across said series resonant circuit, whereby voltage of asymmetrical rectangular waveform is provided across said capacitor, a second winding upon said inductor core, means for applying transient electric impulses of selectively variable polarity to said second winding for selectively reversing the asymmetry of said rectangular waveform voltage, and means for indicating the direction of such asymmetry comprising an ammeter and an electron discharge device having an anode, a control electrode and a cathode, said ammeter, anode and cathode being connected across said means for applying alternating voltage, and said control electrode and cathode being connected across said capacitor.

References Cited in the file of this patent

UNITED STATES PATENTS

| Number | Name | Date |
|---|---|---|
| 2,278,516 | Gulliksen | Apr. 7, 1942 |
| 2,404,047 | Flory et al. | July 16, 1946 |
| 2,411,848 | Camras | Dec. 3, 1946 |

OTHER REFERENCES

Publication: Proceedings of the I. R. E., vol. 38, #6, June 1950, title "Magnetic Triggers," by An Wang; pages 626–629. (Copy in Div. 42, 340–174.6.)